April 18, 1939.  C. F. STROMEYER  2,154,783
ELECTRICAL TRANSMISSION SYSTEM
Filed Jan. 13, 1932  2 Sheets-Sheet 1
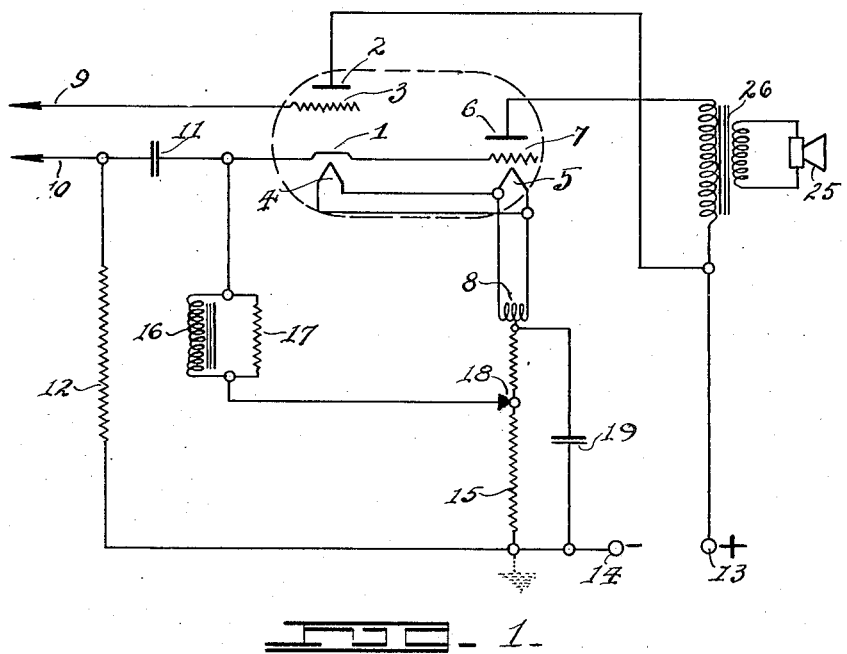
FIG. 1.
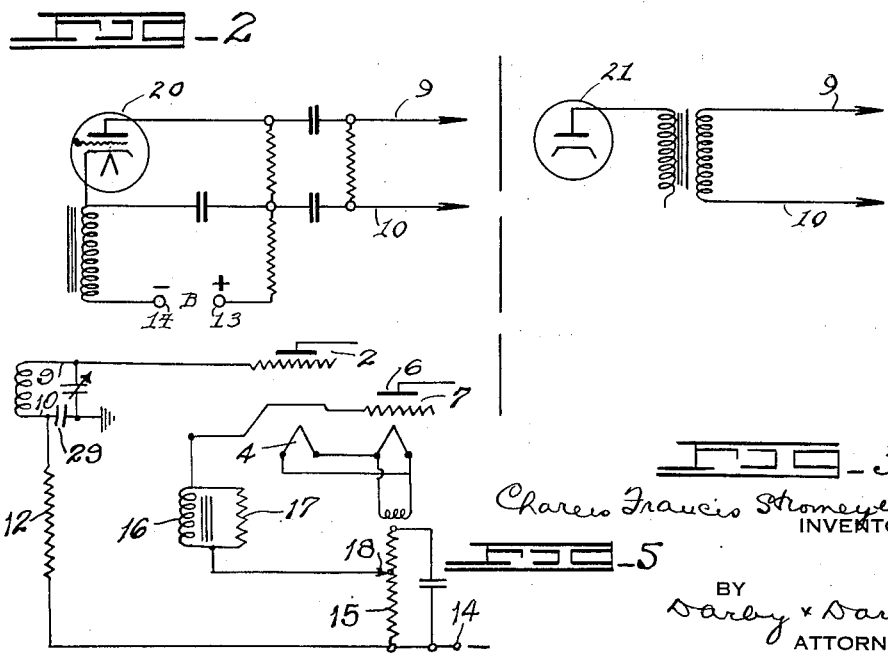
FIG. 2.
FIG. 3.
FIG. 5.
Charles Francis Stromeyer
INVENTOR
BY Darby & Darby
ATTORNEYS April 18, 1939.   C. F. STROMEYER   2,154,783
ELECTRICAL TRANSMISSION SYSTEM
Filed Jan. 13, 1932   2 Sheets-Sheet 2

Charles Francis Stromeyer
INVENTOR

BY Darby & Darby
ATTORNEYS

Patented Apr. 18, 1939

2,154,783

UNITED STATES PATENT OFFICE 2,154,783

ELECTRICAL TRANSMISSION SYSTEM

Charles Francis Stromeyer, Mount Vernon, N. Y., assignor to Revelation Patents Holding Company, New York, N. Y., a corporation of Delaware Application January 13, 1932, Serial No. 586,301

16 Claims. (Cl. 250—27)

This invention relates to transmission systems and with particularity to systems employing electric discharge devices as detectors and/or amplifiers and/or repeaters.

The invention is in the nature of an improvement upon the circuits and systems disclosed in application Serial Nos. 394,172, 414,287 and 533,396. There are disclosed in said prior applications various methods and apparatus for effecting the amplification of electric variations with a maximum power output and a minimum of distortion. In general this is accomplished by utilizing the positive region of the grid voltage-plate current characteristic, in addition to the negative portion usually employed.

While the system disclosed in said applications may be used for amplifying and/or detecting, nevertheless it is highly desirable to employ special circuit arrangements whereby the various input and output sections may be utilized to their maximum efficiency.

Accordingly it is one of the principal objects of the present invention to provide a novel method and circuit arrangements for coupling electric discharge devices.

Another object is to provide a complete detecting and amplifying system employing a single tube, involving a novel combination of circuits functioning therewith.

A feature of the invention relates to a system employing two sets of electrodes such as are ordinarily employed in audions, together with circuit arrangements whereby the control grid of one set may operate in the positive region of its grid-plate characteristic without producing noticeable distortion.

A further feature of the invention resides in a system employing two sets of triodes and circuit arrangements whereby the load or output impedance of the first set exists between the cathode and ground (or the negative end of the anode supply), and whereby the input impedance of the second set is part of the load impedance of the first set.

A still further feature resides in a system employing two sets of triode elements together with circuit arrangements whereby the varying input resistance of the second set of elements is directly across the load of the first set, which load exists between the cathode of the first set and the negative point of the anode potential.

A still further feature relates to a system employing two sets of triode elements wherein the cathode of the first set is directly connected to the grid of the second set in conjunction with circuit arrangements for controlling the bias of the grids of the respective sets.

A still further feature relates to the novel organization and arrangement of elements which go to make up a cheap, simple and efficient detecting and/or amplifying system.

Other features and advantages not specifically enumerated will be apparent after a consideration of the following detail description and the appended claims.

In the drawings—

Fig. 1 represents a typical amplifying system employing the present invention;

Figs. 2 and 3 are schematic representations of detector or amplifier coupling means for use in conjunction with the system of Fig. 1;

Fig. 5 is a schematic representation of a coupling method for a tuned circuit with one side mechanically grounded (or connected to the negative pole of the anode supply) for use in conjunction with the system of Fig. 4.

As is well known, ordinary transmission circuits employing vacuum tube repeaters or audions, are materially limited in their output efficiency because of the fact that it has always been considered necessary to prevent the grid of a tube or tubes swinging positive with respect to an associated cathode. The present invention, however, provides a system wherein a tube or tubes may be operated with zero bias or even with a small negative or positive bias without introducing distortion such as would ordinarily accompany grid current flow. Furthermore, conventional audion systems are materially limited in efficiency because of the necessity of operating the audions into a load having approximately twice the internal or plate impedance of the audion. The present invention provides circuit arrangements and connections whereby the output sections of a vacuum tube system may be operated into a load which equals, or very nearly equals the tube impedance, thus approaching the characteristics of an ideally loaded generator.

In accordance with the present invention two sets of triodes, each including cathode, anode and control grid, are employed. These triodes may be arranged in separate envelopes, or may be suitably mounted within the same envelope as disclosed in application Serial No. 414,287. As disclosed in the various applications referred to above, the first set of triode elements may be termed the input section, while the second set of triode elements may be termed the output section, with the cathode of the first section preferably directly and/or conductively connected to the grid of the second section.

Figure 1A:
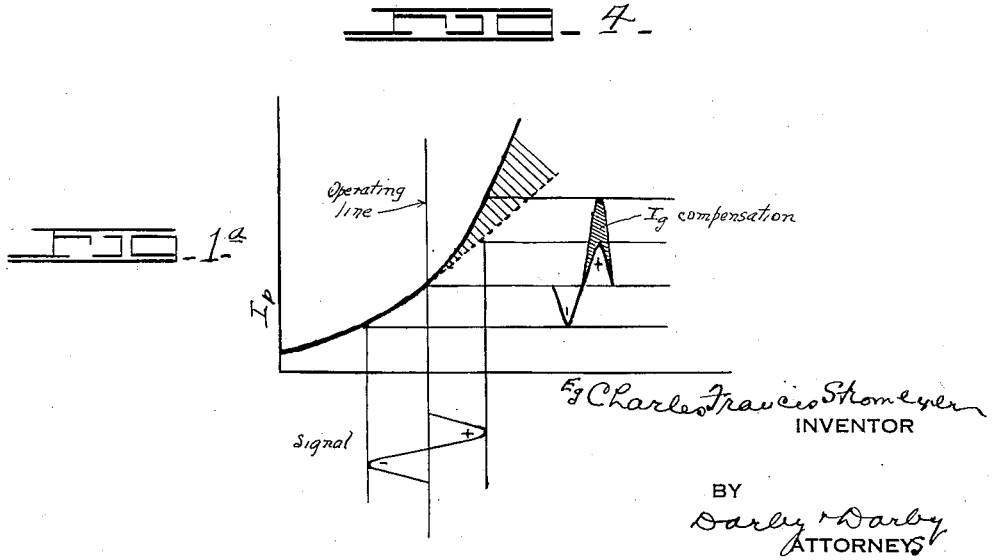
Fig. 1a shows a series of curves explaining the operation of the invention.

Referring more particularly to Fig. 1 of the drawings in this application, there is shown a typical combination of elements and circuits for achieving the objects of the invention. The first triode section comprises a cathode 1, anode 2, control grid 3. Preferably, although not necessarily, the cathode 1 is of the so-called indirectly heated type, whereby it may be insulated from the heater element or filament 4. Similarly the second triode section comprises cathode 5, anode 6, and control grid 7. Preferably, although not necessarily, this section may be designed to act as a power output section and with an ordinary filamentary cathode 5. The current for heating the members 4 and 5 may be derived from any suitable source, such for example as the secondary 8 of a step-down transformer, although it will be understood that the invention is not limited to the use of low frequency alternating current for this purpose.

The signals to be amplified are received over the conductors 9 and 10. The conductor 9 may be connected directly and/or conductively to the grid 3, while the conductor 10 may be connected through a condenser 11 to the cathode 1, which in turn is preferably directly and conductively connected to the grid 7. Condenser 11 is preferably of sufficient capacity to afford a very low impedance to the received signal variations, for example a 2 mfd. condenser may be employed. The direct current path from the grid 3 to the cathode 1 includes the resistance 12 which is preferably high enough to prevent the cathode being substantially short circuited through condenser 11 to ground, or to the negative pole of the anode supply.

Any suitable source of operating anode potential may be employed, this source having its positive pole connected to the terminal 13 and its negative pole (which may be grounded) connected to the terminal 14. The negative terminal 14 is connected to the cathode 5 (preferably at its midpoint) through the resistor 15, whereas the cathode 1 is connected to the negative terminal 14 through the inductive reactance 16 and the shunt resistance 17; preferably the reactor 16 is of very low D. C. resistance and the resistance 17 is chosen of a suitable value as described in application Serial No. 533,396. The operation of the first triode or input section is along conventional lines as the grid 3 is preferably biased so as not to draw current. However, it is to be noted that the cathode 1 is above ground potential, or is at least higher in potential than the terminal 14. Consequently the applied voltage will likewise be above ground or the negative potential of the system. The negative bias for the grid 3 is derived from the D. C. drop in potential in the load impedance of the first triode section, and the D. C. drop through the lower portion of resistance 15. If desired, there may be provided an adjustable connection from the cathode 1 to the resistance 15, as indicated by the numeral 18. In accordance with usual practice, the signal variations are shunted from the resistance 15 by a suitable condenser 19. The triode sections may be mounted in a single enclosing envelope, as indicated by the dotted lines, or they may be mounted in separate envelopes.

One of the outstanding features of the circuit arrangement disclosed is the fact that the output or load impedance of the first triode section exists between the cathode 1 and ground (or the negative terminal of the system), and is composed substantially of the combined value of resistance 17 and the input grid impedance of the second triode section. The inductance 16 also is connected in shunt to the resistance 17 and the grid cathode of the second section, but the impedance of element 16 is preferably high, except at audio frequencies and lower, its function being mainly to provide a D. C. return path for the grid and anode currents of the first triode section. The D. C. drop through element 16 it is true augments the drop through the lower section of resistance 15, but the value of the drop through element 16 is negligibly small because of the low ohmic resistance of element 16.

By means of the upper section of resistance 15 the grid 7 may be given any desired negative bias with respect to cathode 5. However, this bias is only required where the system is operated from an A. C. supply, since a low negative bias on grid 7 has been found materially advantageous in suppressing A. C. hum.

It will be apparent that when the grid 7 swings positive with respect to cathode 5, and therefore draws current, the impedance of the grid input circuit of this second section cannot be considered constant but is in fact some function of the positive cycle of the voltage developed across the cathode and ground of the first triode section. This in effect represents a varying load to the first tube. However, it must be noted that the pulsating voltage developed between the cathode and ground of the input section is in phase with the pulsating plate current of this section and consequently in phase with the original applied signal. In other words, whenever the applied signal is positive the grid 7 is likewise positive. While under certain conditions there may be a very slight phase displacement between these two voltages, this displacement is extremely small as compared with the displacement of 180° in the ordinary triode coupling circuit. It will be understood, of course, that the circuit arrangements shown in Fig. 1 are not limited to the amplification of low frequency or audio frequency currents, but are capable of utilization in the amplification of currents of any range of frequencies.

By means of the circuit arrangement shown in Fig. 1, it is possible to maintain a substantially constant voltage across the load impedance of the first triode section, notwithstanding the flow of grid current in the second section. It is, therefore, possible to maintain the voltage across the load impedance of the first section substantially independent of grid resistance of the second section. In order to accomplish this the voltage delivered by the first section must be substantially constant. As the effective load impedance of the first section decreases the plate impedance likewise decreases, thus tending to produce the desired constant voltage. In other words, the ratio of the combined effective load impedance of the input section to the plate internal impedance of this section remains practically constant so that the voltage developed across this load impedance is independent of these variations.

The geometric configuration of the triodes and constants of the circuits may be chosen so that the spreading and curvature of the grid voltage-plate current characteristic are in the right direction to provide a plate impedance which is capable of variations to compensate fully for the grid current drawn by the second section. The extra current demanded by the lower grid impedance is supplied in the manner graphically shown in Fig. 1ª.

An inspection of this figure shows that on the left of the operating line the Eg-Ip characteristic is shown with a constant load. On the right, this line approaches the ordinate and its rate is a function of the magnitude of the positive cycle. The shaded area in this figure represents the grid current compensation. The grid current peak is shown as part of a sinusoid, however, the non-linear shape of the Eg-Ip characteristic limits this wave form but is similarly compensated since the compensating current also approximately assumes the irregular shape. It is apparent, therefore, that the static grid bias of the second section is not a function of the grid current, but remains substantially constant.

Where the amplifier is to be used in a modulated carrier system, or where pre-amplifier stage is to be used, either type of system, employing any suitable form, may be coupled to the conductors 9 and 10. However, two suggested types of coupling systems are shown in Figs. 2 and 3. The usual form of resistance capacity coupling may be used but, if the detector or amplifier stage 20 in Fig. 2 is supplied by an anode potential which is the same as that used across 14 and 13 in Fig. 1, a special system may be used so that terminal 10 will be substantially above ground potential (or negative pole of the anode supply). Fig. 2 schematically represents this special combination of resistance capacity coupling between the detector or amplifier tube 20 and the input conductors 9 and 10, using a common anode supply. Fig. 3 represents schematically a conventional transformer coupling between the detector or amplifier tube 21 and the said conductors 9 and 10.

Figure 4:
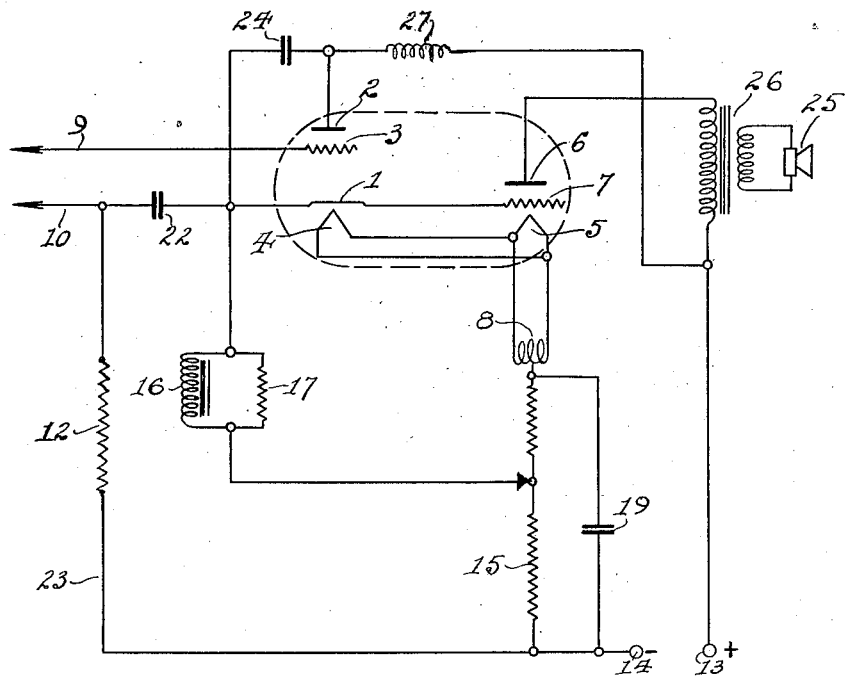
Fig. 4 shows how the system of Fig. 1 may be modified to utilize combined detecting and amplifying powers.

Referring to Fig. 4, there is shown a typical arrangement whereby the amplifier of Fig. 1 may be used simultaneously as a detector, thus enabling a single tube to act as detector and power amplifier. It has been found that the compensating action of the first triode section will also function at the same time that it is used for detection. For example, in Fig. 4 the circuits are designed so as to cause the first triode section to function as a detector by "plate rectification." The circuit arrangements for this purpose are substantially similar to those shown in Fig. 1. The condenser 24 and reactor 27 are, as in usual detector amplifier systems, employed to prevent higher frequency currents than the detected current circulating in the output circuit and anode supply. The electrical value for condenser 24 is preferably chosen to offer a low impedance for the higher frequency currents and a high impedance to the detected current, whereas, reactor 27, preferably offers a high impedance to the high frequency current and a low impedance to the detected current. As described above in connection with Fig. 1, the inductance 16 is preferably of very low D. C. resistance and the preferably constant bias for rectification is supplied to the grid 3 by means of the D. C. drop in the lower section of the resistance 15, which drop is derived from the plate current of the second triode section. With this arrangement small changes in the plate current of the first triode section have negligible effect in changing the bias on the grids 3 and 7.

The function of the remaining portions of the circuit of Fig. 4 are similar to those described in connection with Fig. 1, and for this purpose the corresponding elements bear the same designations. Of course the circuit of Fig. 4 is designed to operate directly from a modulated high frequency signal or from any other type of electrical signal having low frequency variations which are to be detected and amplified. A detector-amplifier system is also suggested by using the circuit in Fig. 4 with the elimination of resistance 12 and by using a capacity of condenser 22 that will offer a high impedance to the detected current. This system, although seemingly more economical, has been found to be less sensitive.

Referring to Fig. 5, there is shown a suggested system of coupling a tuned circuit employing a condenser which has one side mechanically grounded and/or connected to the negative pole of the anode supply and to the conductors 9 and 10 of Fig. 4. The capacity of condenser 29 is selected to offer a high impedance to the detected current and a low value to the higher frequency current. Consequently the condenser 29 provides a high impedance shunt for the detected current from terminal 10 to ground, which in effect, does not shunt the load impedance 16 and 17 of the first triode.

It has been found that with the system of Fig. 4, plotting percentage modulation versus output current provides a substantially linear characteristic throughout an extraordinary range of percentage modulation, and that likewise carrier input versus output current, for any given modulation, is linear. The absence of distortion in the systems of Figs. 1 and 4 may be attributed in a large measure to the fact that the cathode of the first section is directly coupled to the grid of the second section, as well as to the mutual cancellation of harmonics in the couplings between the two sections. The circuit of Fig. 4 produces an undistorted power output which is approximately equal to two pentodes, or three triodes (operating at the same plate watts), and at the same time eliminates the usual detector tube. Furthermore, the circuit arrangement entirely eliminates transformers or other complicated and expensive couplings between the triode sections, the only coupling that is necessary being the reactor 16 and the shunt resistance 17. The former can be made very inexpensively because it is not required to carry very heavy currents and the effect of its impedance on the "frequency-gain characteristic" is very small.

While certain specific combinations and arrangements of elements are disclosed in the drawings, it will be understood that the invention is not limited thereto. For example, while Figs. 1 and 4 show the amplifier feeding directly into a reproducing or translating unit 25 through a transformer coupling 26, any other manner of coupling the reproducing unit to the amplifier can be employed.

It will be understood, of course that other stages of amplification either of the conventional type or of the type of Figs. 1 and 4, may be added ahead of the reproducer 25.

Furthermore, while the drawings show the plates 2 and 6 of the respective triode sections connected to the same potential on the anode supply, obviously the plates 2 and 6 may be connected to any suitable potential, depending upon the design and characteristic of the respective triode sections.

Furthermore, while the drawings disclose specific methods of applying the static grid bias by employing IR drops it will be understood that any other well known method of supplying this normal grid bias may be employed.

It will also be clearly understood that the invention is not limited to a system wherein the grid 7 of the second triode section operates with a negative bias since the system functions with remarkable results with zero bias, and even with a positive bias on the second section.

It will be understood that the term triode is employed herein merely for descriptive purposes and the invention can be embodied in any type of radio tube employing at least three electrodes including cathode, anode and control electrode, and may be also employed in any other type of radio tube employing cathode, anode, control grid, and one or more other grids.

Various other changes and modifications may be made without departing from the spirit and scope of the invention.

What is claimed is:

1. In combination a first triode, a second triode, a short-circuit connection between the cathode of the first triode and the grid of the second triode, an envelope containing both said triodes, a load circuit for the first triode connected across the grid and cathode of the second triode, and connected to the negative terminal of the anode supply, said circuit including in series the cathode of the first triode, a load element, and means for adjusting the normal static bias on the grids of the first and second triodes.

2. In an electrical system, a first thermionic valve, a second thermionic valve, said valves having cathode, anode and control electrodes, a short circuit connection between the cathode of the first valve and the control electrode of the second valve, a source of anode potential supply, means for connecting the anodes of each of said valves to a positive terminal of said source, a circuit connecting the cathode of the first valve to a negative terminal of said source and including impedance in series, a circuit connecting the cathode of the second valve with a negative terminal of said source, whereby potential for biasing the control electrodes is obtained by utilizing voltage existing between the cathode of each valve and a negative end of said source, and a circuit connecting the control electrode of the first valve to a negative terminal of said source and including in series circuit elements for introducing an input signal.

3. In an electrical system, a first thermionic valve, a second thermionic valve, said valves having cathode, anode and control electrodes, a short circuit connection between the cathode of the first valve and the control electrode of the second valve, a source of anode potential supply, means for connecting the anodes of each of said valves to a positive terminal of said source, a circuit connecting the cathode of the first valve to a negative terminal of said source and including impedance in series, a circuit connecting the cathode of the second valve with a negative terminal of said source and including in series circuit means for establishing a biasing potential on the control electrode of the second valve, and a circuit connecting the control electrode of the first valve to the said impedance opposite to the end adjacent to the cathode of the first valve and including in series circuit elements for introducing an input signal.

4. In combination a first triode, a second triode, a resistance connected between the cathode of the second triode and the negative terminal of the anode supply, a resistance connected between the cathode of the first triode and a point intermediate the ends of said first resistance, and a uni-potential connection from the first cathode to the second grid.

5. In combination a first triode, a second triode, a single envelope containing said triodes, a resistance connected between the cathode of the second triode and the negative terminal of the anode supply, and a connection from said resistance to the grid of said second triode including in series a load resistance, the cathode of the first triode and a direct connection from the cathode of the first triode to the grid of the second triode.

6. In combination a first triode, a second triode, a direct connection between the cathode of the first triode and the grid of the second triode, a pair of input conductors for said first triode, one of said conductors being directly connected to the grid of the first triode and the other of said conductors being connected to the cathode of said triode through a condenser, shunt circuits on both sides of said condenser, including a high resistance on one side and a resistance on the other side, a connection from one end of the first resistance to the negative terminal of the anode supply, a connection from one end of the second resistance to the negative terminal of the anode supply, the input resistance of the second triode being connected across said second resistance.

7. In combination a first triode, a second triode, an envelope containing said triodes, the input resistance of the second triode being connected in series with the load of the first triode, which load includes a resistance connected between the cathode of the first triode and the negative terminal of the anode supply, and means for operating the first of said triodes on the detector portion of its characteristic curve.

8. In combination a first triode, a second triode, a shunt for the grid cathode space of the second triode, said shunt including in series the cathode of the first triode and a load resistance for the first triode, and means for biasing the grid of the first triode to cause said first triode to act as a detector.

9. In combination a first triode, a second triode, a pair of input conductors for said first triode, one of said conductors being directly connected to the grid of the first triode through a condenser, a direct connection from the cathode of the first triode to the grid of the second triode, shunt circuits on both sides of said condenser, a high resistance on one side and a resistance on the other side, a connection from one end of the first resistance to the negative terminal of the anode supply, a connection from one end of the second resistance to the negative terminal of the anode supply, the other terminal of said second resistance being connected to the cathode of the first triode, means for biasing the grid of the first triode to cause said first triode to act as a detector, and means for connecting the grid cathode space of the second triode in shunt to said second resistance.

10. In a vacuum tube circuit, an evacuated envelope containing an input set of elements comprising a cathode, a grid and an anode, and an output set of elements comprising a cathode, a grid and an anode, the two cathodes being insulated from each other and the second mentioned grid being directly connected with the first mentioned cathode and also being connected with the second mentioned cathode, in combination with means for obtaining operation on the negative as well as the positive characteristics of the output grid.

11. In a vacuum tube circuit an evacuated envelope containing an input set of elements comprising a cathode, a grid and an anode and an output set of elements comprising a grid, an anode and a cathode, said first-mentioned cathode being insulated from the other cathode, the second mentioned grid being connected with the first mentioned cathode, and also being connected with the second mentioned cathode in series with a conductive element and a source of potential so that the negative terminal of said source is toward the grid.

12. In an electric system, a first thermionic valve, a second thermionic valve, said valves having cathode, grid, and anode electrodes, a source of anode potential supply, a direct conductive coupling connection from the cathode of said first valve to the grid of said second valve, means including circuit connections for connecting the anode circuits of said valves in parallel across said source, impedance means inserted in the cathode leads of said valves comprising a choke coil in the cathode lead of said first valve for maintaining predetermined operating potentials of said electrodes and for producing coupling potential for said second valve, and a resistance shunted by a bypass condenser in the cathode lead of said first valve for producing grid bias potential for said first valve.

13. In an electrical system, a first thermionic valve; a second thermionic valve, said valves having cathode anode and control electrodes; a source of anode potential supply; means for directly and conductively connecting the cathode of said first valve to the control electrode of said second valve; means including circuit connection from the anode of each of said valves to the positive terminal of said source; further means including circuit connections from the cathode electrodes of said valves to the opposite terminal of said source; an inductance means inserted in a cathode lead of said first valve; and an impedance means inserted in the cathode lead of said second valve for maintaining predetermined operating potential for said electrodes and for producing coupling potential between said valves.

14. In a system as described in claim 13, a biasing resistor in the cathode lead of said first valve shunted by a bypass condenser for producing grid biasing potential for said first valve.

15. In an electrical system; a first thermionic tube; a second thermionic tube; said tubes having cathode, anode and grid electrodes; a source of anode potential supply; connections from the anodes of said tubes to the positive pole of said source; a resistance and a choke coil in series connected between the cathode of said first tube and the negative pole of said source; a further resistance connecting the cathode of said second tube with the negative pole of said source; and a direct conductive coupling connection from the cathode of said first tube to the grid of said second tube.

16. In an electrical system, a first thermionic tube, a second thermionic tube, said tubes having cathode, anode and control electrodes, a short-circuit connection between the cathode of the first tube and the control electrode of the second tube, a load circuit for the first tube connected across the control electrode and cathode of the second tube, and connected to the negative terminal of the anode supply, said circuit including in series the cathode of the first tube, a load element, and means for adjusting the normal static bias on the control electrodes of the first and second tubes.

CHARLES FRANCIS STROMEYER.